Figure 1:
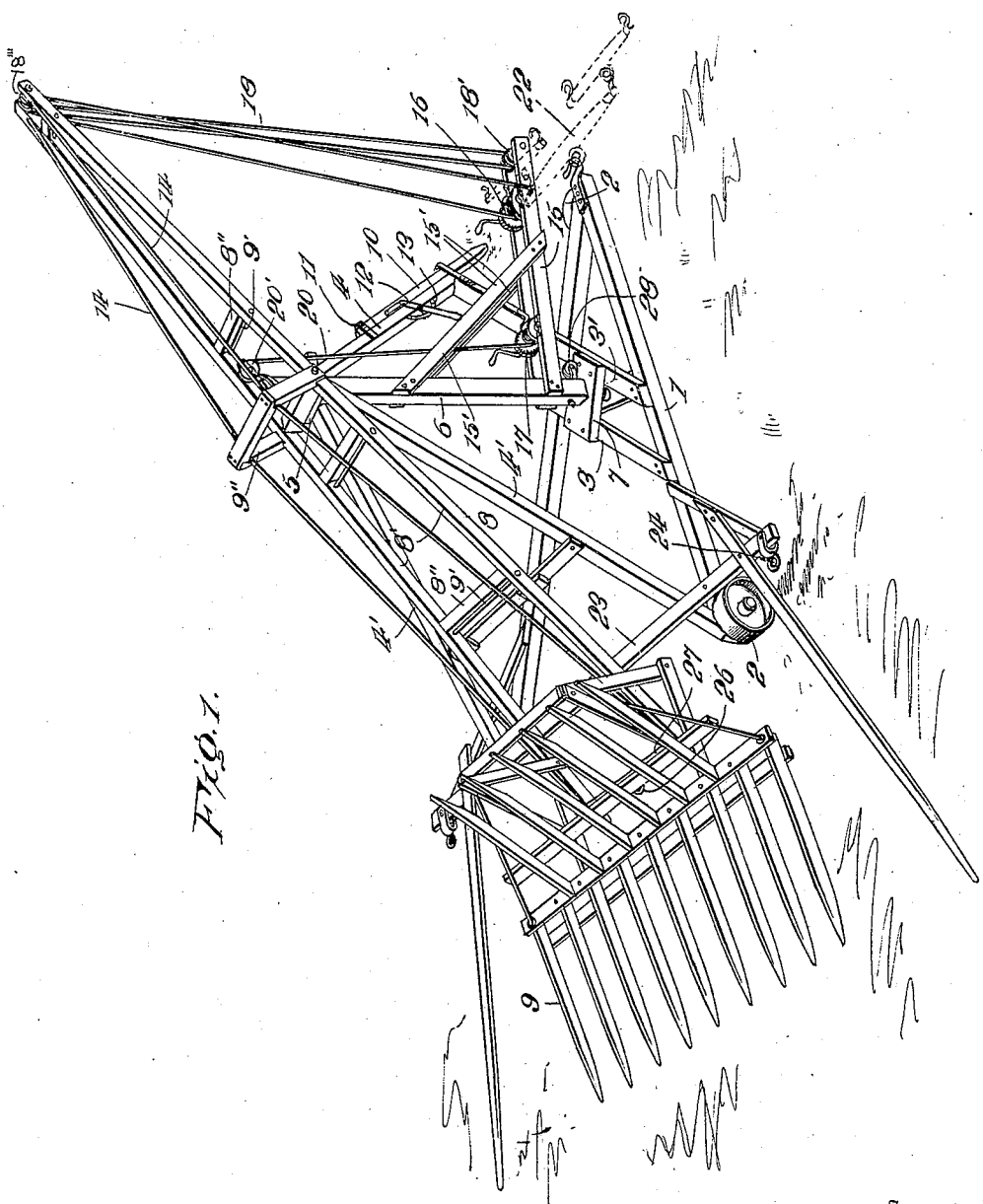

No. 843,539. PATENTED FEB. 5, 1907.
A. LAGE.
HAY AND GRAIN LOADER, UNLOADER, AND STACKER.
APPLICATION FILED SEPT. 11, 1905.

2 SHEETS—SHEET 1.

Witnesses
Louis H. Schmidt.
H. Welsh

Inventor
August Lage,
By
Swift &C.
Attorneys.

No. 843,539. PATENTED FEB. 5, 1907.
A. LAGE.
HAY AND GRAIN LOADER, UNLOADER, AND STACKER.
APPLICATION FILED SEPT. 11, 1905.
2 SHEETS—SHEET 2.
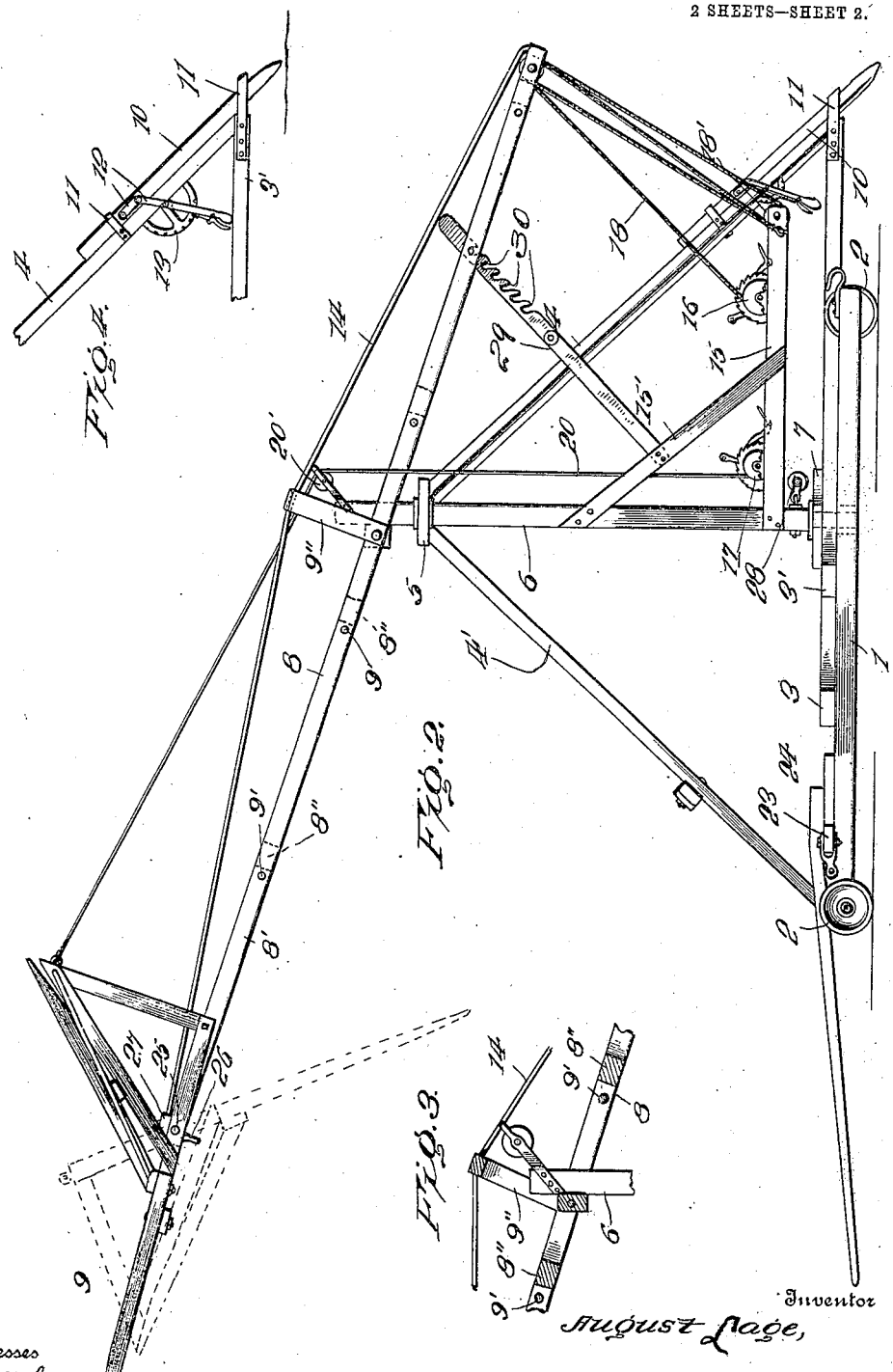
Witnesses
L. H. Schmidt
H. Welsh
Inventor
August Lage,
By
Swift &C.
Attorneys.

UNITED STATES PATENT OFFICE.

AUGUST LAGE, OF EVERLY, IOWA.

HAY AND GRAIN LOADER, UNLOADER, AND STACKER.

No. 843,539.          Specification of Letters Patent.          Patented Feb. 5, 1907.

Application filed September 11, 1905. Serial No. 277,887.

*To all whom it may concern:*

Be it known that I, AUGUST LAGE, a citizen of the United States, residing at Everly, in the county of Clay and State of Iowa, have invented a new and useful Hay and Grain Loader, Unloader, and Stacker; and I do hereby declare the following to be a full, clear, and exact description of the invention, such as will enable others skilled in the art to which it appertains to make and use the same.

My invention relates to improvements in hay and grain loaders, unloaders, and stackers; and it consists, essentially, of a triangular-shaped frame or a base mounted upon suitable vehicle-wheels and provided with a vertically-mounted shaft adapted to carry and support an elongated yard or arm having a hay or grain fork pivotally mounted upon the front portion thereof, said vertical shaft being capable of a limited rotation to permit of the ready swinging of the yard or arm carrying the hay or grain fork from one side to the other, and said yard or arm being adapted to oscillate up and down to enable the hay or grain fork to take up or deliver its load, as will be hereinafter more fully described, illustrated in the drawings, and particularly designated in the claims.

One of the objects of my invention is to provide an improved mechanism for facilitating the operation of loading, unloading, or stacking hay or grain and to accomplish such result in the simplest and best possible manner.

A further object of my invention is to provide a construction of the character indicated which shall be strong and durable, capable of ready and easy operation, combined with simplicity of parts and ease of repair.

In the accompanying drawings, wherein like numerals of reference indicate corresponding parts, Figure 1 represents a perspective view of my improved machine with the horses detached therefrom and the yard or arm with its hay or grain fork in position to receive its load from the windrows formed by sulky hay-rakes independent of this machine, the pivoted lever 29 not being shown. Fig. 2 is a side elevation of my improved machine with the yard or arm carrying the loaded hay or grain fork in an elevated position ready to dump or deliver its load to a hay-wagon or to stack in the open air. Fig. 3 is a detail sectional view of the vertical shaft carrying the yard or arm, showing its bearings and connection with other parts of the machine. Fig. 4 is a detail side view of the adjustable supporting-post upon one side of the machine.

In carrying out my invention the frame or body of the machine is preferably formed of a triangular-shaped base 1, mounted upon suitable vehicle-wheels 2 at the front and rear parts of the same, as shown more fully in Fig. 1. Near the pointed end of said frame or base are secured two obliquely-slanting cross-beams 3 3', the latter projecting outwardly a short distance from the side of the frame 1 to receive the lower end of the support 4, the upper end of the same being rigidly secured to the head 5, which is also provided with similar supports 4', extending therefrom to each side of the broad part of the said frame or base. The vertical shaft 6 is mounted near its upper end in said head 5 and at its bottom in the rest or support 7, secured to the cross-beams 3 3' in such manner that said shaft 6 is supported in a vertical position therein and adapted to have a limited rotation for the purposes to be hereinafter mentioned.

Near the upper part of the vertical shaft 6 is pivotally mounted thereon the elongated yard or arm 8, which carries at its forward end the pivoted hay or grain fork 9, the several parts acting in connection with each other in such manner as to permit the yard or arm 8 to be oscillated from side to side, to have an upward and downward movement at its ends, and to permit the hay or grain fork to also have a limited upward and downward swing or movement for purposes hereinafter described.

At or near the base of the support 4 is provided a sliding and adjustable post 10, which is mounted in clips 11, secured to said support 4 and to the outer end of 3' to permit the post 10 to move freely therein, said post being moved up or down upon the support 4 by means of the pivoted levers 12, connecting therewith and engaging with the rack-bar 13, secured to the under part of the support 4 to hold the lower pointed end of the supporting-post into engagement with the ground to prevent the machine from tilting over when the loaded fork is swung around to deliver its load.

The elongated yard or arm 8 is composed of two side bars 8', secured together a suitable distance apart by cross-beams 8″ and iron brace-rods 9′. A truss formed of the elevated frame 9″ and the brace-rods 14, passing therethrough to both ends of the yard or arm, forms a strong, rigid, and light construction. Near the lower part of the vertical shaft 6 is provided an open frame 15, projecting outwardly therefrom a suitable distance and secured thereto at its inner ends and further supported by the side braces 15′. This open frame 15 is adapted to receive a windlass 16 near its outer end and a smaller windlass 17 near the side of the vertical shaft 6, the free end of the rope or cable 18 passing over the pulleys 18′, which are mounted upon shafts 18″ in the ends of said open frame 15, and the one end of the yard or arm 8 being connected to the windlass 16 so as to permit of the ready elevation or depression of the yard or arm. The rope or cable 20, connecting the arm of the hay or grain fork with the smaller windlass 17, operates to raise or lower the said fork to receive or deliver its load, said rope or cable passing from the arm of said fork over the pulley 20′ on the top of the vertical shaft 6 down into engagement with said windlass 17, as fully shown in the drawings.

The general construction of my improved machine being substantially as above described, the operation of the same may be stated as follows: The horses are first attached to the machine by the tree 22 on the pointed end of the same and the machine drawn into the field ready for operation. The horses are then detached from the rear or pointed end of the machine and again attached, one on each side of the front or broad end of the same to the cross-bar 23, which extends entirely across and projects outwardly from each side of the triangular base or frame 1, and the fork 9 being lowered by the yard or arm 8 lies flat upon the ground, as fully shown in Fig. 1, and as the machine is propelled forward the hay or grain lying in windrows formed by the ordinary horse hay-rake is taken up or gathered by the fork 9 until a sufficient load is acquired thereon. The driver, who sits upon the cross-beam 3, then detaches the horse upon the right-hand side of the machine and attaches him to the ring 24 upon the left-hand end of the cross-beam 23, so as to be out of the way during the operation of elevating and dumping the load of hay or grain. The driver then operates the windlass 16 to elevate the front end of the yard or arm carrying the loaded fork, and by pushing upon the open frame 15 swings said yard or arm, with its loaded fork, over the hay-wagon or to the stack, as may be desired. He then operates the smaller windlass 17 to cause the fork to drop down and deliver its load, when the several parts are returned to their former position to again repeat the same operation above described.

To use the machine as a stacker, the hay or grain is drawn to the machine-fork while lying flat upon the ground by the ordinary horse hay-rake and deposited thereon until the fork has received a sufficient load, when it is elevated and swung over to the stack and dumped thereon in the manner already above described, the topping-off of the stack being accomplished by a man standing on the stack and forking the hay or grain by hand from the machine-fork until the stack is completed.

To use the machine as an unloader, the machine-fork 9 is removed from the yard or arm 8 by pulling out the rod 25, which connects it thereto, and attaching in place thereof any style of grip-fork to the hook 26 in the center of the cross-beam 27 at the front end of said yard or arm. The grip-fork takes its load from the stack and is then swung over the hay-wagon by means of the yard or arm, and its load deposited thereon. The fork may, however, be operated by a rope passing therefrom over the small pulley 28 at the foot of the vertical shaft 6 to a horse employed for the purpose, either in unloading or stacking the hay or grain.

In order to hold the arm 8 in its adjusted position when heavily weighted, a pivoted lever 29, having ratchet-teeth 30, is provided, which will engage a suitable rod mounted in the arm 8. The lever can be readily turned down when its use is not desired.

When the team is hitched to cross-bar 23, a cable will be used for the purpose of permitting the horses to keep safely out of the way of the forwardly and outwardly projecting members connected with said cross-bar. Also said members may, if desired, be omitted from the device.

Having thus described my invention, what I claim as new, and desire to secure by Letters Patent, is—

1. The combination with a wheeled frame, of a fork-arm mounted about a vertical and a horizontal axis and a fork pivoted to said arm and adapted to be thrown to a position to act as a rake.

2. The combination of the triangular-shaped base, wheels at the three corners of the same, a fork-arm mounted to swing about a vertical and a horizontal axis, a fork pivoted to said arm, and an adjustable post carried by the base and adapted to be thrown into engagement with the ground to prevent the machine tilting over when the fork is thrown to deliver its load.

3. The combination with the base of wheels supporting the base, a vertical post or shaft mounted to have a limited rotary motion on the base, a head in which said shaft or post turns, supports connecting the head and the base, an arm pivoted intermediate its ends to said post or shaft, a fork pivoted to one end of the arm, and adapted to be thrown by said arm to a position to act as a rake, a frame secured to and extending from the post or shaft, a windless and cable carried by the frame, and connected to the fork for operating it, and a windlass and cable carried by the frame, and connected to the arm for operating it.

In testimony whereof I have hereto affixed my signature in the presence of two witnesses.

AUGUST LAGE.

Witnesses:
GEO. NUGENT,
LEWIS SCHARNBERG.